United States Patent
Kudo

(10) Patent No.: US 9,757,953 B2
(45) Date of Patent: Sep. 12, 2017

(54) FLOW PATH OPENING/CLOSING APPARATUS AND LIQUID EJECTING APPARATUS

(71) Applicant: Seiko Epson Corporation, Tokyo (JP)

(72) Inventor: Yasuyuki Kudo, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/876,046

(22) Filed: Oct. 6, 2015

(65) Prior Publication Data

US 2016/0114591 A1    Apr. 28, 2016

(30) Foreign Application Priority Data

Oct. 27, 2014    (JP) .................................. 2014-218641

(51) Int. Cl.
- *B41J 2/175* (2006.01)
- *G05D 16/06* (2006.01)
- *B41J 2/19* (2006.01)

(52) U.S. Cl.
CPC ............. *B41J 2/17596* (2013.01); *B41J 2/19* (2013.01); *G05D 16/0641* (2013.01)

(58) Field of Classification Search
None
See application file for complete search history.

(56) References Cited

U.S. PATENT DOCUMENTS

| 2002/0027583 A1 | 3/2002 | Nakamura |
| 2012/0194608 A1* | 8/2012 | Matsumoto .......... B41J 2/16532 347/30 |

FOREIGN PATENT DOCUMENTS

| JP | 2002-067352 A | 3/2002 |
| JP | 2007-331350 A | 12/2007 |
| JP | 2012-158002 A | 8/2012 |

* cited by examiner

*Primary Examiner* — Erica Lin
(74) *Attorney, Agent, or Firm* — Harness, Dickey & Pierce, P.L.C.

(57) ABSTRACT

A flow path opening/closing apparatus includes a lid member and a receptacle member fixed to the lid member. The receptacle member includes a first wall that defines an outflow opening that is open to the lid member and a second wall provided around the first wall. The lid member closes the outflow opening by contacting the first wall due to relative movement of the lid member with respect to the receptacle member. A surface that is one of surfaces of the first wall and that faces the lid member and a surface that is one of surfaces of the second wall and that faces the lid member are separate by a stepped portion.

20 Claims, 10 Drawing Sheets

FLOW PATH OPENING/CLOSING APPARATUS AND LIQUID EJECTING APPARATUS

BACKGROUND

1. Technical Field

The present invention relates to a flow path opening/closing apparatus that opens and closes a flow path and to a liquid ejecting apparatus equipped with the opening/closing apparatus.

2. Related Art

An ink jet type recording apparatus, an example of a liquid ejecting apparatus, is provided with a suction apparatus (cleaning apparatus) that performs cleaning by sucking bubbles or undesired matters together ink from nozzles of a recording head that ejects the ink.

Because there are cases where the suction by the suction apparatus does not discharge bubbles in the recording head, a so-called choke cleaning is performed (see, e.g., JP-A-2007-331350) in which while a flow path that supplies ink of a recording head is closed by a dedicated flow path opening/closing apparatus the suction apparatus performs suction from the nozzles to increase the pressure in the closed flow path, and then the closure of the flow path by the flow path opening/closing apparatus is discontinued, that is, the flow path is opened, so that the ink in the flow path is discharged from the nozzles all at once together with undesired matters such as bubbles.

However, there are demands that the capability of discharging undesired matters, such as bubbles or dust, from a flow path within the flow path opening/closing apparatus be improved and also demands that the growth of deposit caused by the opening and closing of the flow path be reduced to ensure the reliable opening and closing operations.

That is, inside the flow path opening/closing apparatus, in a liquid reservoir portion where the opening and closing of the flow path is performed, liquid having flown in from an inflow opening that is open to the liquid reservoir portion tends to flow the shortest distance to an outflow opening that is open to the liquid reservoir portion, so that undesired matters contained in the ink, such as dust or bubbles, and components contained in the ink are likely to reside in regions other than the vicinity of a straight line connecting the inflow opening and the outflow opening.

Incidentally, this problem is not limited to the flow path opening/closing apparatuses that are mounted in liquid ejecting apparatuses represented by an ink jet type recording head but similarly occurs in flow path opening/closing apparatuses used in other apparatuses.

SUMMARY

An advantage of some aspects of the invention is that, in a flow path opening/closing apparatus and a liquid ejecting apparatus, the capability of discharging undesired matters is improved by stirring liquid and the growth of deposit caused by the operation of opening and closing the flow path can be reduced to ensure the reliable opening and closing operations.

A first aspect of the invention is a flow path opening/closing apparatus that includes a lid member and a receptacle member fixed to the lid member. The receptacle member includes a first wall that defines an outflow opening that is open toward the lid member and a second wall provided around the first wall. The lid member closes the outflow opening by contacting the first wall due to relative movement of the lid member with respect to the receptacle member. A surface that is one of surfaces of the first wall and that faces the lid member and a surface that is one of surfaces of the second wall and that faces the lid member are separate by a stepped portion.

According to this aspect of the invention, the provision of the second wall facilitates controlling flow of a liquid to the outflow opening. Furthermore, since the first wall and the second wall are separate by the stepped portion, the lid member does not easily contact the second wall. Even if the lid member contacts the second wall, the growth of deposit of a component of the liquid accumulated due to repeated contacts with the lid member can be inhibited.

A second aspect of the invention is a flow path opening/closing apparatus that includes a lid member and a receptacle member fixed to the lid member. The receptacle member includes a first wall that defines an outflow opening that is open toward the lid member and a second wall provided around the first wall. A surface that is one of surfaces of the first wall and that faces the lid member and a surface that is one of surfaces of the second wall and that faces the lid member have portions that flush with each other. The lid member closes the outflow opening by contacting the first wall without contacting the second wall, due to relative movement of the lid member with respect to the receptacle member.

According to this aspect of the invention, the provision of the second wall facilitates controlling flow of a liquid to the outflow opening. Furthermore, since the lid member does not contact the second wall, the growth of deposit of a component of the liquid accumulated due to repeated contacts with the lid member can be inhibited.

In the first and second aspects, the receptacle member may have an inflow opening and the second wall may be provided on a virtual straight line that connects the inflow opening and the outflow opening. With this construction, since the second wall is provided between the inflow opening and the outflow opening, the liquid supplied from the inflow opening can be inhibited from flowing linearly and can form a flow that stirs the liquid in a space between the receptacle member and the lid member.

In the foregoing construction, flow path resistance to a flow toward the outflow opening in a radius direction of a virtual circle whose center is in the outflow opening may decrease gradually in a circumferential direction of the circle from the inflow opening. Therefore, since the second wall gradually decreases the flow path resistance to flow in the radius direction toward the outflow opening, the liquid can be caused to flow from a position apart from the inflow opening toward the outflow opening, so that a flow of the liquid in the circumferential direction of the outflow opening can be formed.

In the foregoing construction, a portion of the second wall where a clearance between the second wall and the lid member is smallest may be provided in a range of angular position less than or equal to 90 degrees and greater than or equal to 270 degrees along a virtual circle whose center is in the outflow opening provided that the inflow opening is defined as being at 0 degree and a clockwise direction is a positive direction. Therefore, since the liquid supplied from the inflow opening can be inhibited from flowing linearly toward the outflow opening, the stirring of the liquid can be further improved.

Furthermore, in any of the foregoing constructions, a portion of the second wall where a clearance from the lid member is largest may be provided in a range of angular position greater than or equal to 90 degrees and less than or equal to 180 degrees along a virtual circle whose center is in the outflow opening provided that the inflow opening is defined as being at 0 degree and a clockwise direction is a positive direction, and an inflow path that extends through the inflow opening may be provided so that a liquid supplied to the inflow opening flows counterclockwise along an arc of a virtual circle whose center is in the outflow opening. Therefore, since the liquid supplied from the inflow opening can be caused to flow to the opposite side of the outflow opening to the inflow opening, the stirring of the liquid can be further improved.

Further, a portion of the second wall where a clearance from the lid member is largest may be provided in a range of angular position greater than or equal to 180 degrees and less than or equal to 270 degrees along a virtual circle whose center is in the outflow opening provided that the inflow opening is defined as being at 0 degree and a clockwise direction is a positive direction, and an inflow path that extends through the inflow opening may be provided so that a liquid supplied to the inflow opening flows clockwise along an arc of a virtual circle whose center is in the outflow opening. Therefore, the liquid supplied from the inflow opening can be caused to flow to the opposite side of the outflow opening to the inflow opening, the stirring of the liquid can be further improved.

A third aspect of the invention is a liquid ejecting apparatus that includes any one of the flow path opening/closing apparatuses described above and a liquid ejecting head that ejects a liquid supplied via the flow path opening/closing apparatus.

According to this aspect, a liquid ejecting apparatus that improves the capability of discharging undesired matters or bubbles contained in the liquid so as to inhibit the occurrence of imperfect ejection of the liquid and maintains an appropriate operation of opening and closing a flow path over a long time can be realized.

DESCRIPTION OF EXEMPLARY EMBODIMENTS

The invention will be described in detail hereinafter based on exemplary embodiments.

Exemplary Embodiment 1

Figure 1:
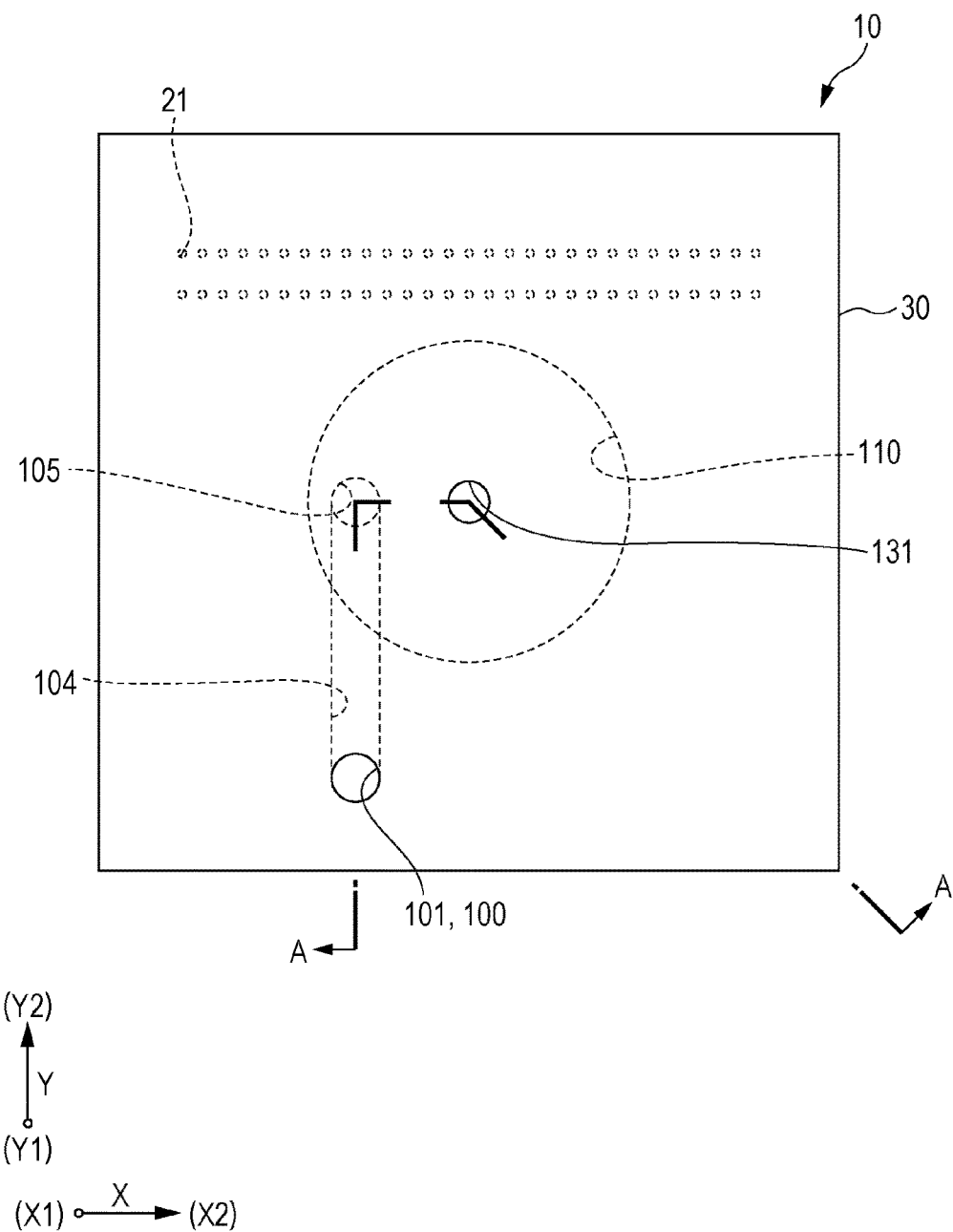
FIG. 1 is a plan view of a head unit according to Exemplary Embodiment 1.
Figure 2A:
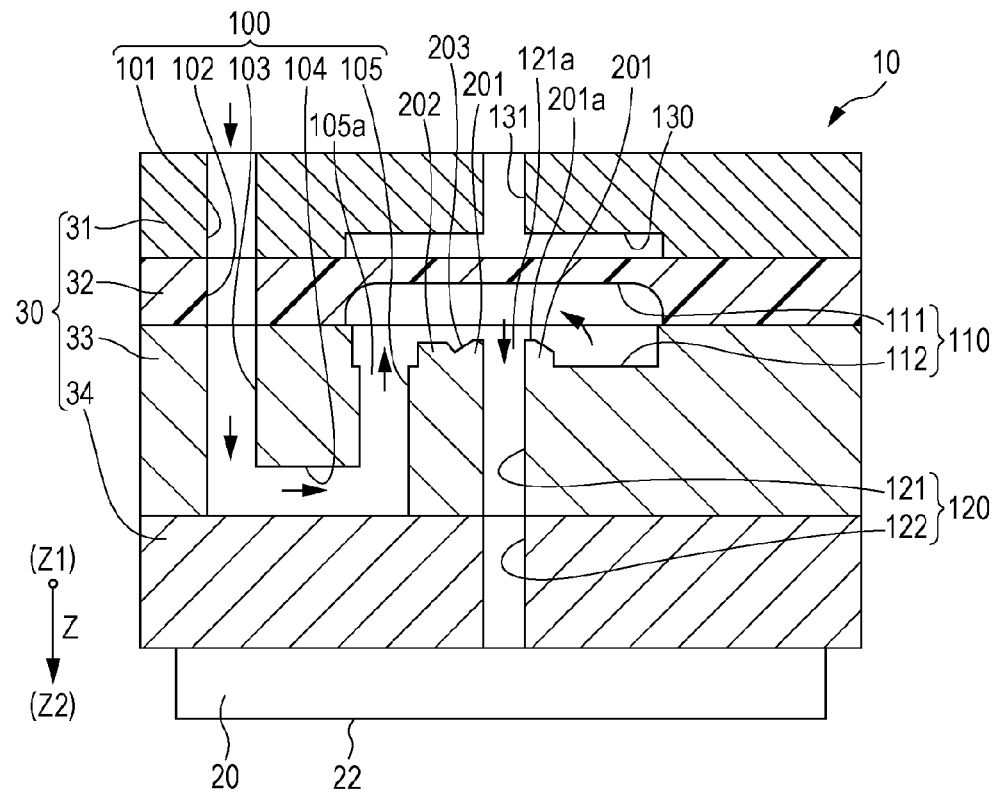
FIGS. 2A and 2B are a sectional view of portions of the head unit according to Exemplary Embodiment 1 and an enlarged partial view thereof.
Figure 2B:
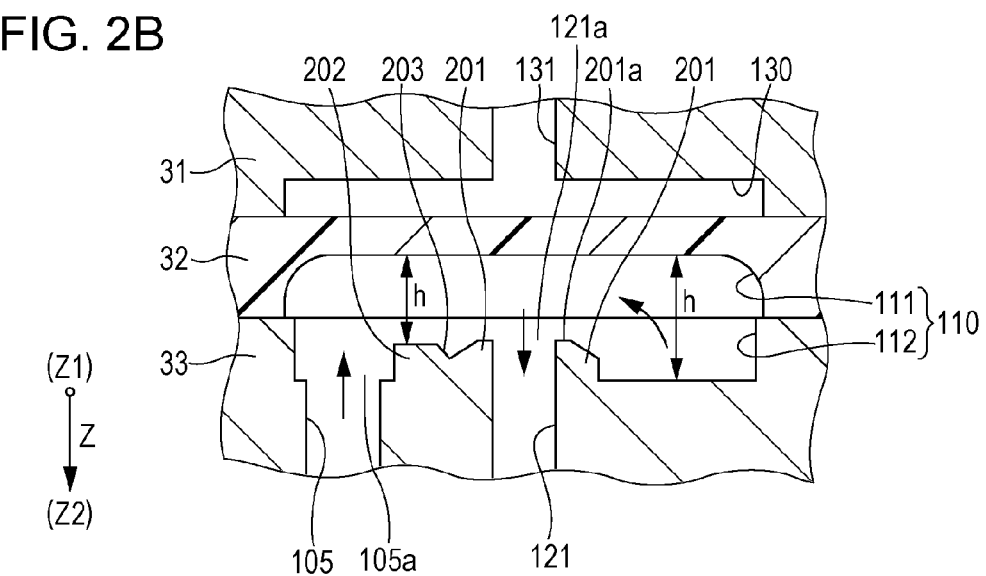
Figure 4:
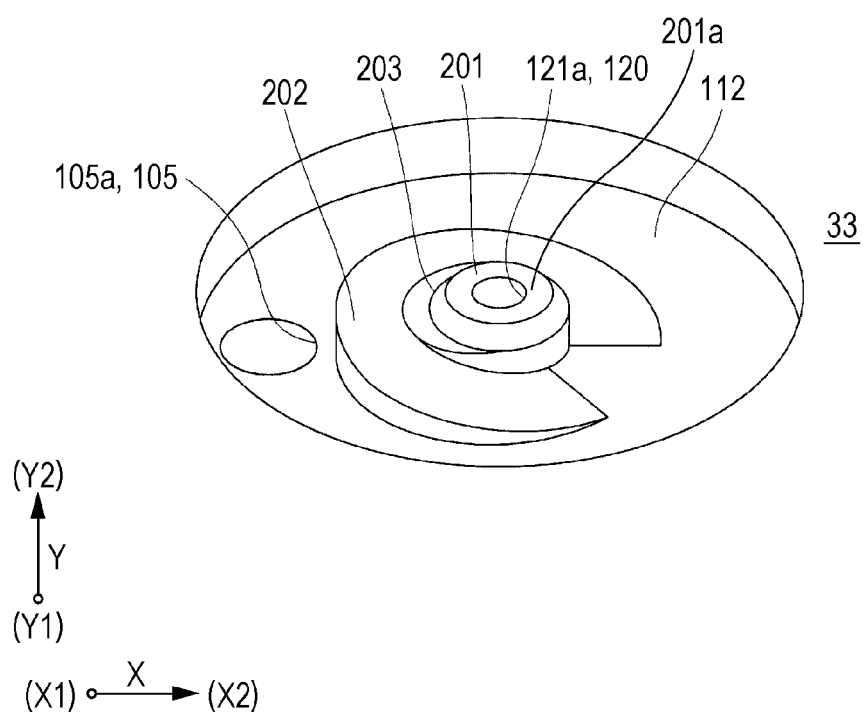
FIG. 4 is a perspective view of portions of a flow path opening/closing apparatus according to Exemplary Embodiment 1.
Figure 5:
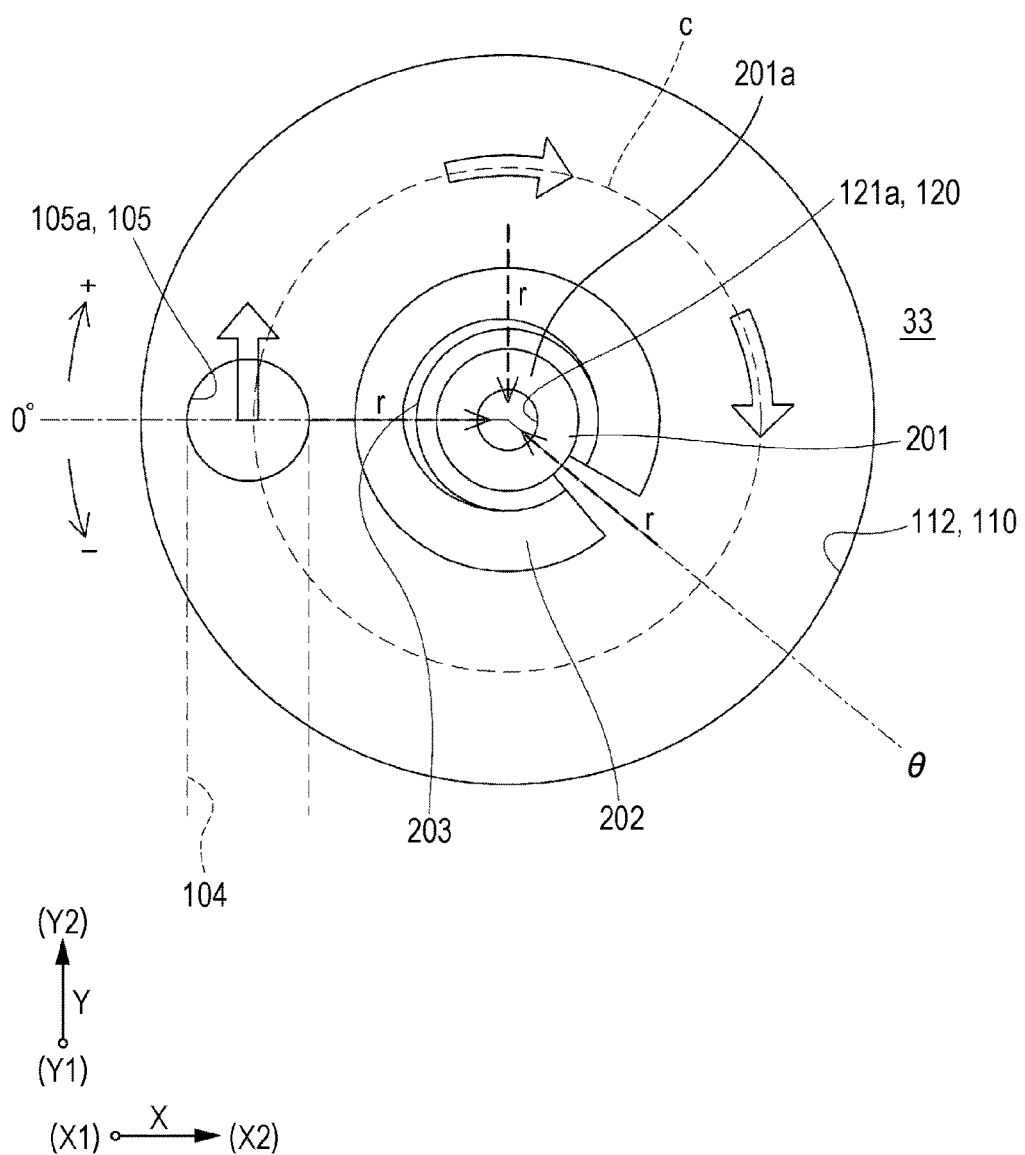
FIG. 5 is a plan view of portions of the flow path opening/closing apparatus according to Exemplary Embodiment 1.

FIG. 1 is a plan view of an ink jet type recording head unit as an example of a liquid ejecting head unit according to Exemplary Embodiment 1 of the invention. FIGS. 2A and 2B and FIGS. 3A and 3B are sectional views of portions of the ink jet type recording head taken on line A-A in FIG. 1 and enlarged partial views thereof. Furthermore, FIG. 4 is an enlarged perspective view of portions of a flow path opening/closing apparatus, and FIG. 5 is an enlarged plan view of portions of the flow path opening/closing apparatus.

As shown in these diagrams, an ink jet type recording head unit 10 (hereinafter, referred to simply as head unit 10), an example of the liquid ejecting head unit of this exemplary embodiment, includes an ink jet type recording head 20 (hereinafter, also referred to simply as recording head 20) that ejects ink in the form of ink drops and a flow path opening/closing apparatus 30 that is provided with a flow path for supplying the ink to the recording head 20 and that is capable of opening and closing the flow path.

The recording head 20 has on a surface a liquid ejecting surface 22 in which openings of nozzles 21 that eject ink drops in the form of liquid have been formed. In the liquid ejecting surface 22 in this exemplary embodiment, a plurality of nozzle arrays in each of which nozzles 21 are juxtaposed are arranged in a direction that intersects the direction in which the nozzles 21 of each nozzle array are juxtaposed. In this exemplary embodiment, the direction in which the nozzles 21 of a nozzle array are juxtaposed is termed first direction X and a direction which is orthogonal to the first direction X and in which the nozzle arrays are juxtaposed is termed second direction Y. Furthermore, a direction orthogonal to both the first direction X and the second direction Y is termed third direction Z. In this exemplary embodiment, one of two opposite sides in the first direction X is termed X1 side and the other side is termed X2 side. Likewise, one of two opposite sides in the second direction Y is termed Y1 side and the other side is termed Y2 side. Furthermore, in the third direction Z, one side where ink drops are ejected is termed Z2 side, and the opposite side is termed Z1 side. The head unit 10 in this exemplary embodiment is disposed so that the direction from the Z1 side to the Z2 side along the third direction Z is vertically downward. That is, the Z2 side, which is a vertically downward side, is the side on which the liquid ejecting surface 22 is provided.

An interior (not depicted in the drawings) of the recording head 20 is provided with flow paths that communicate with the nozzles 21 and communicate with the flow path of the flow path opening/closing apparatus 30, a pressure generation unit that causes a pressure change in the ink in the flow path, etc. Such a pressure regulation unit may be, for example, a unit that causes a pressure change in the ink in the flow path and therefore discharges ink drops from the nozzles by changing the capacity of the flow path by deformation of a piezoelectric actuator that has a piezoelectric material that performs an electromechanical transduction function, a unit that discharges ink drops from the nozzles by thermally forming bubbles by heat generated by heating elements disposed in the flow paths, a generally termed electrostatic actuator that creates an electrostatic force between a vibration plate and an electrode so that the electrostatic force deforms the vibration plate to discharge ink drops from the nozzles.

In the recording head 20 constructed as described above, the Z1 side in the third direction Z is connected to the flow path opening/closing apparatus 30. Specifically, the recording head 20 and the flow path opening/closing apparatus 30 are juxtaposed in the third direction Z, with the recording head 20 disposed on the Z2 side and the flow path opening/closing apparatus 30 on the Z1 side. Incidentally, although in this exemplary embodiment, the recording head 20 and the flow path opening/closing apparatus 30 are directly connected, this manner of connection is not restrictive. For example, the recording head 20 and the flow path opening/closing apparatus 30 may be connected to each other via another flow path member, a tube, etc.

The flow path opening/closing apparatus 30 includes a first flow path member 31, a lid member 32, a receptacle member 33, and a second flow path member 34. The first flow path member 31, the lid member 32, the receptacle member 33, and the second flow path member 34 are layered in that order from the Z1 side to the Z2 side in the third direction Z.

Inside this flow path opening/closing apparatus 30 there are provided an inflow path 100 into which ink is supplied from a liquid storage unit or the like in which ink is stored, a liquid reservoir portion 110 that communicates with the inflow path 100, and an outflow path 120 that communicates with the liquid reservoir portion 110 and also communicates with the recording head 20.

Specifically, the first flow path member 31 is disposed at the Z1 side in the third direction Z and is provided with a first inflow path 101 that extends through the first flow path member 31 in the third direction Z, which is the thickness direction of the first flow path member 31.

Furthermore, the first flow path member 31 is provided with a recess-shaped pressure regulation chamber 130 that is open to the Z2 side. The pressure regulation chamber 130 is provided in a region that corresponds to a first recess portion 111 of a lid member 32 (described later in detail), that is, a region that overlie the first recess portion 111 in a plan view in the third direction Z. The opening of the thus formed pressure regulation chamber 130 is closed by the lid member 32. Furthermore, the first flow path member 31 is provided with a pressure regulation path 131 an end of which communicates with the pressure regulation chamber 130. Another end of the pressure regulation path 131 is connected to a fluid supply source (not depicted). The fluid supply source supplies a fluid, such as liquid or gas, for example, air or other kinds of gas, into the pressure regulation chamber 130 and causes the fluid to be discharged from the pressure regulation chamber 130, so that pressure regulation in the pressure regulation chamber 130 is possible.

The lid member 32 is fixed directly or indirectly to a Z2-side surface of the first flow path member 31, and may be made of, for example, a deformable material, such as a film-shaped resin material or an elastic material, including rubber, elastomer, etc., a difficult-to-deform resin material that is injection-molded, etc. Incidentally, when a difficult-to-deform resin material is used to form the lid member 32, interposition of a member, for example, an expandable and contractible accordion-shaped member, an elastic member, etc., between, for example, the lid member 32 and the receptacle member 33, will allow the lid member to move in the third direction Z relative to the receptacle member 33. That is, it suffices that the lid member 32 is provided to be movable relative to the receptacle member 33; therefore, the lid member 32 itself may be capable of elastic deformation or the lid member 32 may be a member that is not deformable but can move relative to the receptacle member 33. However, even in the case where the lid member 32 is a member that can move relative to the receptacle member 33, there remains an arrangement in which ink is supplied into a space between the lid member 32 and the receptacle member 33 and fluid is supplied to and discharged from the pressure regulation chamber 130 between the lid member 32 and the first flow path member 31, and therefore this space and the pressure regulation chamber 130 still need to be tightly closed.

In this exemplary embodiment, the lid member 32 is a platy member formed from an elastic material such as rubber. The thus formed lid member 32 is provided with the first recess portion 111 that is open to the Z2 side, which is the receptacle member 33 side. Furthermore, the lid member 32 is provided with a second inflow path 102 that communicates with the first inflow path 101 of the first flow path member 31.

The receptacle member 33 is provided on a Z2-side surface of the lid member 32. In this exemplary embodiment, the lid member 32 is held between the first flow path member 31 and the receptacle member 33.

The thus formed receptacle member 33 is provided with a second recess portion 112 that is open toward the lid member 32. The second recess portion 112 is provided in a region that faces the first recess portion 111 of the lid member 32. The second recess portion 112 in this exemplary embodiment is provided to be seen to have a circular opening in a plan view in the third direction Z. Of course, the shape of the second recess portion 112 is not limited to a circular shape but may also be an elliptical shape or the like. However, since ink will be caused to flow along a peripheral wall, it is preferable that the inner peripheral wall of the second recess portion 112 be made up of a curved surface. Thus, the liquid reservoir portion 110 in this exemplary embodiment is formed by the first recess portion 111 of the lid member 32 and the second recess portion 112 of the receptacle member 33. Incidentally, the liquid reservoir portion 110 is not limited to this construction in particular, but may be, for example, formed by the second recess portion 112 and a platy lid member that closes the opening of the second recess portion 112.

Furthermore, the receptacle member 33 includes a third inflow path 103 which extends through the receptacle member 33 in the third direction Z and an end of which communicates with the second inflow path 102 of the lid member 32, a fourth inflow path 104 which extends in a direction orthogonal to the third direction Z, that is, a direction in a plane containing the first direction X and the second direction Y and an end of which communicates with the third inflow path 103, and a fifth inflow path 105 which extends through the receptacle member 33 in the third direction Z and an end of which communicates with the fourth inflow path 104 and another end of which has an opening in a bottom surface of the second recess portion 112, that is, a Z1-side surface of the receptacle member 33. In this exemplary embodiment, the opening of the fifth inflow path 105 to the second recess portion 112 is referred to as inflow opening 105a. With this receptacle member 33, ink is supplied from the first inflow path 101 of the first flow path member 31 into the second recess portion 112 via the second inflow path 102 of the lid member 32 and via the third inflow path 103, the fourth inflow path 104, and the fifth inflow path 105 of the receptacle member 33. That is, the inflow path 100 in this exemplary embodiment is made up of the first inflow path 101, the second inflow path 102, the third inflow path 103, the fourth inflow path 104, and the fifth inflow path 105. Incidentally, the fourth inflow path 104 is formed in a horizontal direction orthogonal to the third direction Z, that is, in a direction in a plane containing the first direction X and the second direction Y by the second flow path member 34 closing an opening of a groove portion of the receptacle member 33 which is open in the second flow path member 34-side surface of the receptacle member 33. Of course, the fourth inflow path 104 is not limited to a path that extends in a direction in a plane containing the first direction X and the second direction Y; for example, the fourth inflow path 104 may be provided in a direction that intersects a direction in a plane containing the first direction X and the second direction Y. That is, the fourth inflow path 104 may be provided obliquely to the third direction Z. Furthermore, the other flow paths that constitute the inflow path 100, that is, the first inflow path 101, the second inflow path 102, the third inflow path 103, and the fifth inflow path 105, may be provided obliquely to the third direction Z.

Furthermore, the receptacle member 33 is provided with a first outflow path 121 which extends through the receptacle member 33 in the third direction Z and an end of which has an outflow opening 121a in a central portion of the bottom surface of the second recess portion 112. Then, the ink supplied into the second recess portion 112 is allowed to flow out from the outflow opening 121a and through the first outflow path 121. Incidentally, the second flow path member 34 is provided with a second outflow path 122 which extends through the second flow path member 34 in the third direction Z and an end of which communicates with the first outflow path 121 and another end of which communicates with the recording head 20. Therefore, the ink having flown out of the second recess portion 112 is supplied to the recording head 20 via the first outflow path 121 and the second outflow path 122. That is, the outflow path 120 in this exemplary embodiment is made up of the first outflow path 121 provided in the receptacle member 33 and the second outflow path 122 provided in the second flow path member 34. Incidentally, the outflow path 120 is not limited to a path that is formed in the third direction Z. For example, a part or the whole of the outflow path 120 may be provided in a direction that intersects the third direction Z.

The second recess portion 112 of the receptacle member 33 formed as described above has therein a first wall 201 and a second wall 202. The first wall 201 is provided in a central portion of the second recess portion 112 and is protruded in the third direction Z toward the lid member 32, that is, to the Z1 side. The outflow opening 121a of the first outflow path 121 is open in a Z1-side protruded end surface of the first wall 201. As for the thus formed first wall 201 in this exemplary embodiment, a width thereof in a radius direction r of a virtual circle c whose center is in the outflow opening 121a is substantially the same throughout in a circumferential direction of the outflow opening 121a. The lid member 32 contacts the Z1-side end surface of the first wall 201 that surrounds the outflow opening 121a, so that the outflow opening 121a is closed. In this exemplary embodiment, the surface of the first wall 201 which faces the lid member 32 and with which the lid member 32 comes into contact is referred to as contact surface 201a.

The second wall 202 is provided surrounding the first wall 201. Incidentally, the second wall 202 may surround the entire periphery of the first wall 201, that is, may extend, outside the first wall 201, continuously circumferentially around the outflow opening 121a. Alternatively, the second wall 202 may surround only a part of the perimeter of the first wall 201. In this exemplary embodiment, the second wall 202 is provided surrounding only a part of the perimeter of the first wall 201. Concretely, the second wall 202 is provided on a virtual straight line that connects the inflow opening 105a and the outflow opening 121a. Specifically, since the second wall 202 is provided on a virtual straight line that connects the inflow opening 105a and the outflow opening 121a, the flow of ink in a straight-line fashion from the inflow opening 105a toward outflow opening 121a can be blocked by the second wall 202, and therefore a flow that stirs the ink within the liquid reservoir portion 110 can be formed. Furthermore, the second wall 202 is provided so that the flow path resistance to flow from the liquid reservoir portion 110 toward the outflow opening 121a in a radius direction r of the virtual circle c whose center is in the outflow opening 121a gradually decreases with increases in the distance from the inflow opening 105a in circumferential directions of the circle c. Incidentally, the flow path resistance to a flow from the liquid reservoir portion 110 toward the outflow opening in a radius direction r of the virtual circle c whose center is in the outflow opening 121a is defined by, for example, the area of the opening of the liquid reservoir portion 110 in a section taken along a radius direction r. Specifically, high flow path resistance to a flow from the liquid reservoir portion 110 toward the outflow opening 121a in a radius direction r of the circle c means that the area of the opening of the liquid reservoir portion 110 in a section taken along the radius direction is small, and low flow path resistance means that the area of the opening of the liquid reservoir portion 110 in a section taken along the radius direction r is large. In this exemplary embodiment, since the Z2-side bottom surface of the first recess portion 111 of the lid member 32 is provided in horizontal or parallel directions to the receptacle member 33, that is, directions in a plane that contains the first direction X and the second direction Y, the flow path resistance is changed by altering the proportion of the second wall 202 to the opening area of the liquid reservoir portion 110. This flow path resistance of the second wall 202 is defined by the direction of the inflow path 100 that supplies ink to the second recess portion 112. In this exemplary embodiment, the fourth inflow path 104 that constitutes the inflow path 100 is provided along the second direction Y in a plane that contains the first direction X and the second direction Y, and the fifth inflow path 105 communicates with an end portion of the fourth inflow path 104 that is at the Y2 side in the second direction Y. Therefore, ink is supplied from the inflow opening 105a into the second recess portion 112 so that the ink from the inflow opening 105a flows from the Y1 side toward the Y2 side in the second direction Y, that is, flows clockwise within the second recess portion 112. The second wall 202 is provided around the first wall 201 so as to gradually reduce in size so that the clearance h between the second wall 202 and the lid member 32 in the third direction Z is small at the inflow opening 105a side, and is large at a position remote from the inflow opening 105a. Specifically, a surface of the second wall 202 that faces the lid member 32, that is, a Z1-side surface, is a tilted surface that is tilted relative to the contact surface 201a. In this exemplary embodiment, since ink is supplied to the second recess portion 112 so as to flow clockwise therein, it is preferable that a portion of the second wall 202 that gives the smallest clearance h from the lid member 32 be disposed in a range of angular position that is less than or equal to 90 degree and greater than or equal to 270 degrees along the virtual circle c whose center is in the outflow opening 121a provided that the inflow opening 105a is defined as being at degree and the clockwise direction is defined as a positive direction. Specifically, the portion of the second wall 202 that gives the smallest clearance h from the lid member 32 is preferred to be provided in the range of ±90 degrees (including ±90 degrees) provided that the inflow opening 105a is defined as being at 0 degree. Furthermore, a portion of the second wall 202 that gives the largest clearance h from the lid member 32 is preferred to be disposed in the range of angular position greater than or equal to 180 degrees and less than or equal to 270 degrees along the virtual circle c whose center is in the outflow opening 121a provided that the inflow opening 105a is defined as being at 0 degree and the clockwise direction is defined as the positive direction. Incidentally, the portion that gives the smallest clearance h and the portion that provides largest clearance h do not exist simultaneously at the same angular position. That is, if one of the portion that gives the smallest clearance h and the portion that gives the largest clearance h is disposed at a position of 270 degrees, it suffices that the other portion is disposed at a position that is other than 270 degree. In this exemplary embodiment, since the second wall 202 is provided around a portion of the perimeter of the outflow opening 121a, the portion of the second wall 202 that gives the largest clearance h from the lid member 32 is a portion where the second wall 202 is not provided. That is, the portion that gives the largest clearance h between the second wall 202 and the lid member 32 refers to a portion or site where the flow path resistance to flow from the liquid reservoir portion 110 toward the outflow opening 121a in a radius direction r of the virtual circle c whose center is in the outflow opening 121a is the smallest, regardless of the presence or absence of the second wall 202. Of course, in the case where the second wall 202 is provided continuously all around the perimeter of the outflow opening 121a, the portion that gives the largest clearance h between the second wall 202 and the lid member 32 refers to a portion of the second wall 202 that provides the largest clearance h from the lid member 32. The portion that gives the largest clearance h between the second wall 202 and the lid member 32 in this exemplary embodiment is provided at a position whose angle θ is 225 degrees provided that the inflow opening 105a is defined as being at θ degree and the clockwise direction is defined as being the positive direction. That is, in this exemplary embodiment, the second wall 202 is not provided at the position whose angle θ is 225 degrees. More specifically, the second wall 202 in this exemplary embodiment extends from a position of 230 degrees to a position of 220 degrees in the clockwise direction, and the angle of 225 degrees at which the second wall 202 is not provided means the angular position θ of the center of a portion where the second wall 202 is not provided. The second wall 202 extends continuously from the angular position of 230 degrees to the angular position of 220 degrees in the clockwise direction and the portion of the second wall 202 at an angular position of 0 degree is the portion that gives the smallest clearance h from the lid member 32. The second wall 202 is provided so that the protrusion height of the second wall 202 toward the Z1 side gradually decreases from the portion of the second wall 202 that gives the smallest clearance h from the lid member 32, that is, the portion that is the most protruded toward the Z1 side, to the portion of the second wall 202 that gives the largest clearance h, that is, a portion where the second wall 202 is not provided, in both clockwise and counterclockwise in circumferential directions of the outflow opening 121a. Due to this, the second wall 202 in this exemplary embodiment is provided so that the flow path resistance to flow from the liquid reservoir portion 110 toward the outflow opening 121a in a radius direction r of the virtual circle c whose center is in the outflow opening 121a gradually decreases from the inflow opening 105a in circumferential directions of the circle c. Incidentally, the portion of the second wall 202 that gives the smallest clearance h, that is, the portion thereof whose angular position θ is 0 degree, has a height that is equal to the height of the contact surface 201a of the first wall 201, and is therefore substantially flush in height with the contact surface 201a.

Furthermore, in this exemplary embodiment, the contact surface 201a of the first wall 201 and the Z1-side surface of the second wall 202 are separate by a stepped portion. In this exemplary embodiment, a groove portion 203 open to the Z1 side is provided between the first wall 201 and the second wall 202, which can be considered that the first wall 201 and the second wall 202 are separate by a stepped portion. Specifically, the first wall 201 and the second wall 202 being separate by a stepped portion means that the Z1-side contact surface 201a of the first wall 201 and the Z1-side surface of the second wall 202 are not continuously flush with each other, and includes a configuration in which the contact surface 201a of the first wall 201 and the Z1-side surface of the second wall 202 are substantially flush in height with each other but are discontinuous with each other due to the groove portion 203 provided between the first wall 201 and the second wall 202. Of course, the first wall 201 and the second wall 202 being separate by a stepped portion also includes a configuration in which one of the first wall 201 and the second wall 202 is lower than the other in terms of the height in the third direction Z. Furthermore, in this exemplary embodiment, the groove portion 203 is formed by two sloped surfaces the width between which gradually decreases in an increasing depth direction that is a third direction Z. The groove portion 203 is not limited to this configuration in particular, but may be provided so that the above-defined width is consistent in the depth direction.

In the thus constructed flow path opening/closing apparatus 30, since the inflow path 100 that communicates with the X1 side of the liquid reservoir portion 110 is provided along the second direction Y, the ink having flown into the liquid reservoir portion 110 from the inflow path 100 can be caused to flow within the liquid reservoir portion 110 in tangential directions to the virtual circle c whose center is in the outflow opening 121a. Furthermore, the second wall 202 is provided on a virtual straight line that connects the inflow opening 105a and the outflow opening 121a that are formed in the liquid reservoir portion 110, the second wall 202 is provided so that the flow path resistance to flow toward the outflow opening 121a in a radius direction r of a virtual circle c whose center is in the outflow opening 121a gradually decreases in circumferential directions of the circle c from the inflow opening 105a, and portions close to the inflow opening 105a are provided so as to have high flow path resistances and portions remote from the inflow opening 105a are provided so as to have low flow path resistances. Therefore, the ink having flown in from the inflow opening 105a can be caused to flow within the liquid reservoir portion 110 in tangential directions to the virtual circle c whose center is in the outflow opening 121a. Therefore, ink containing bubbles or undesired matters can be inhibited from residing on a peripheral wall of the liquid reservoir portion 110, and the capability of discharging bubbles and undesired matters can be improved. Incidentally, if the second wall 202 is not provided, the ink having flown in from the inflow opening 105a flows along a straight line toward the outflow opening 121a, so that bubbles or undesired matters reside on the peripheral walls of the liquid reservoir portion 110. Then, if residing undesired matters and, particularly, bubbles grow and flow downstream at an unexpected timing, a defective condition, such as imperfect ink ejection of the recording head, can occur. In this exemplary embodiment, since the residence of bubbles or undesired matters within the second recess portion can be inhibited, occurrence of imperfect ink ejection of the recording head can be inhibited.

Furthermore, particularly at the time of so-called initial filling in which the inflow path 100, the liquid reservoir portion 110, and the outflow path 120 are filled with ink from a state where these paths and the like are not filled with ink, if bubbles remain on the peripheral wall of the liquid reservoir portion 110, imperfect ink filling occurs and imperfect ink ejection occurs. However, in this exemplary embodiment, the provision of the second wall 202 inhibits occurrence of the imperfect ink filling at the time of initial filling, so that occurrence of defective conditions, such as imperfect ink ejection, can be inhibited.

Incidentally, in this exemplary embodiment, the ink having flown in from the inflow opening 105a flows mainly in a direction clockwise from 0 degree at the inflow opening 105a to 225 degrees. Therefore, although ink is likely to reside in a region from 0 degree at the inflow opening 105a counterclockwise to 225 degrees, this is a matter of a relatively small region and does not cause a particular problem as long as, at the time of initial ink filling, bubbles do not reside but are discharged. That is, the angular position θ of the portion that gives the largest clearance h and therefore allows bubbles to flow out without residing at the time of initial ink filling can be said to be 225 degrees in this exemplary embodiment. Incidentally, if although the orientation of the inflow path 100 is the same as in this exemplary embodiment, the portion of the second wall 202 that gives the largest clearance h from the lid member 32 is disposed at a position close to the inflow opening 105a, for example, in a range of angular position greater than 0 degree and less than 180 degree, there is a risk of bubbles residing in this region at the time of initial filling. Furthermore, the portion of the second wall 202 that gives the largest clearance h from the lid member 32 is provided in a range of angular position greater than 270 degrees, that is, greater than 270 degrees and less than 360 degrees, there is a risk that the ink from the inflow opening 105a may mainly flow counterclockwise toward the portion of the second wall 202 that gives the largest clearance h from the lid member 32. Therefore, in the case where the inflow path 100 communicates with an X1-side portion of the liquid reservoir portion 110 and extends from the Y1 side to the Y2 side in the second direction Y as in this exemplary embodiment, it is preferable that the portion that gives the largest clearance h between the second wall 202 and the lid member 32 be provided in a range of angular position greater than or equal to 180 degrees and less than or equal to 270 degrees provided that the angular position of the outflow opening 121a is defined as 0 degree and the clockwise direction is defined as the positive direction.

Incidentally, in this exemplary embodiment, since the fourth inflow path 104, in particular, of the inflow path 100, is provided in a tangential direction to the virtual circle c whose center is in the outflow opening 121a, the ink having flown in from the inflow opening 105a flows along the side surface of the second recess portion 112. However, as a matter of course, this is not restrictive. For example, even if the fourth inflow path 104 is provided along the first direction X, the provision of the second wall 202 still causes the ink having flown in from the inflow opening 105a to flow, inside the second recess portion 112, along circumferential directions of the outflow opening 121a. For instance, in the case where the fourth inflow path 104 of the inflow path 100 is provided from the Y1 side to the Y2 side and the fifth inflow path 105 communicates with a Y2-side end portion of the fourth inflow path 104, the ink having flown in from the inflow opening 105a flows counterclockwise in the liquid reservoir portion 110. In this case, the portion of the second wall 202 that gives the largest clearance h from the lid member 32 is preferred to be disposed in a range of angular position greater than or equal to 90 degrees and less than or equal to 180 degrees along the virtual circle c whose center is in the outflow opening 121a provided that the angular position of the inflow opening 105a is defined as 0 degree and the clockwise direction is defined as the positive direction.

Figure 3A:
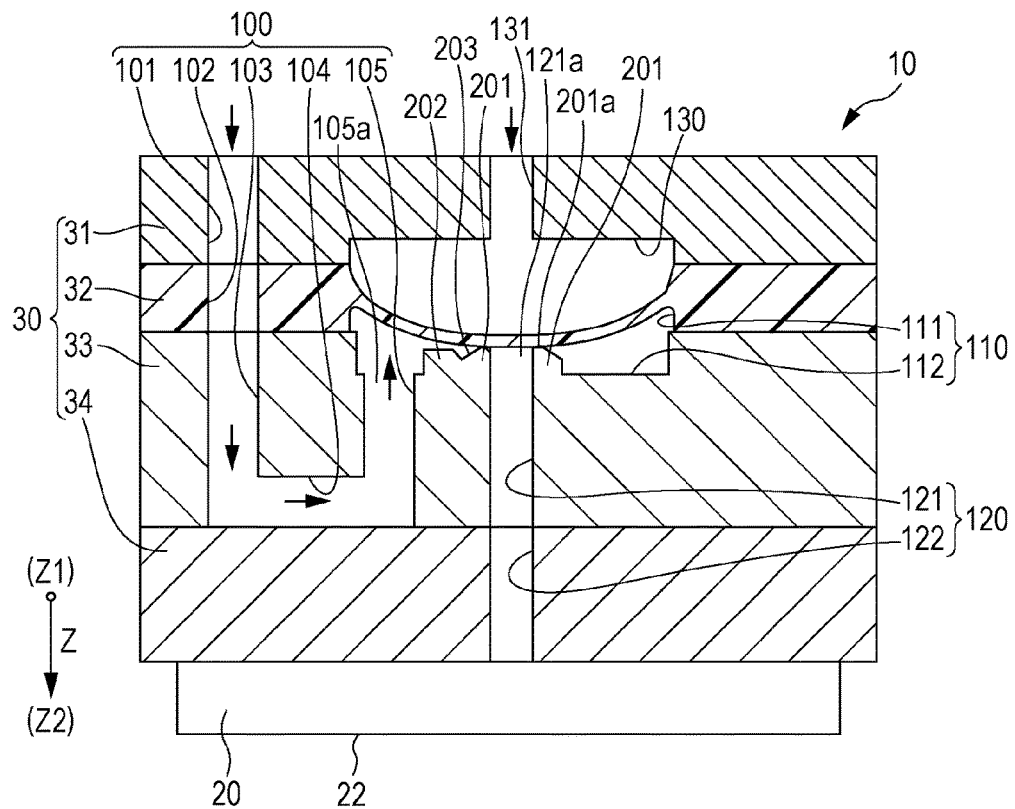
FIGS. 3A and 3B are a sectional view of portions of the head unit according to Exemplary Embodiment 1 and an enlarged partial view thereof.
Figure 3B:
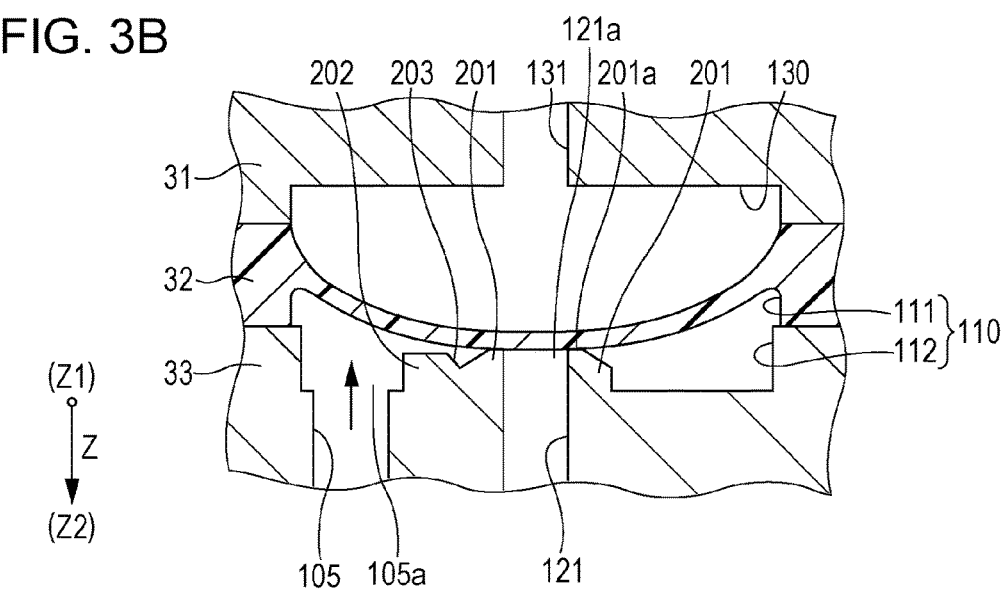
Figure 6A:
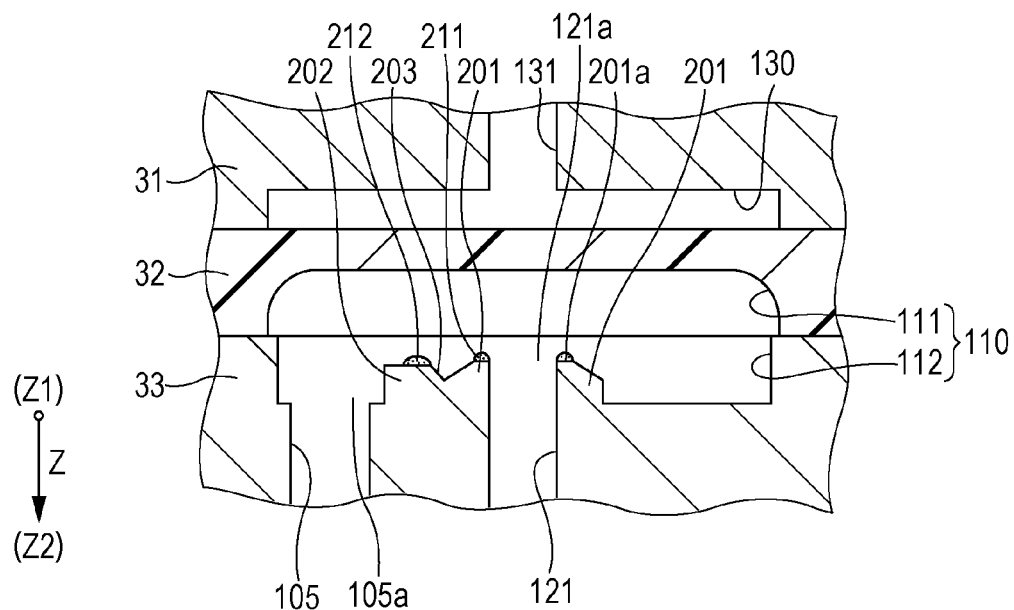
FIGS. 6A and 6B are sectional views of portions of the flow path opening/closing apparatus according to Exemplary Embodiment 1.
Figure 6B:
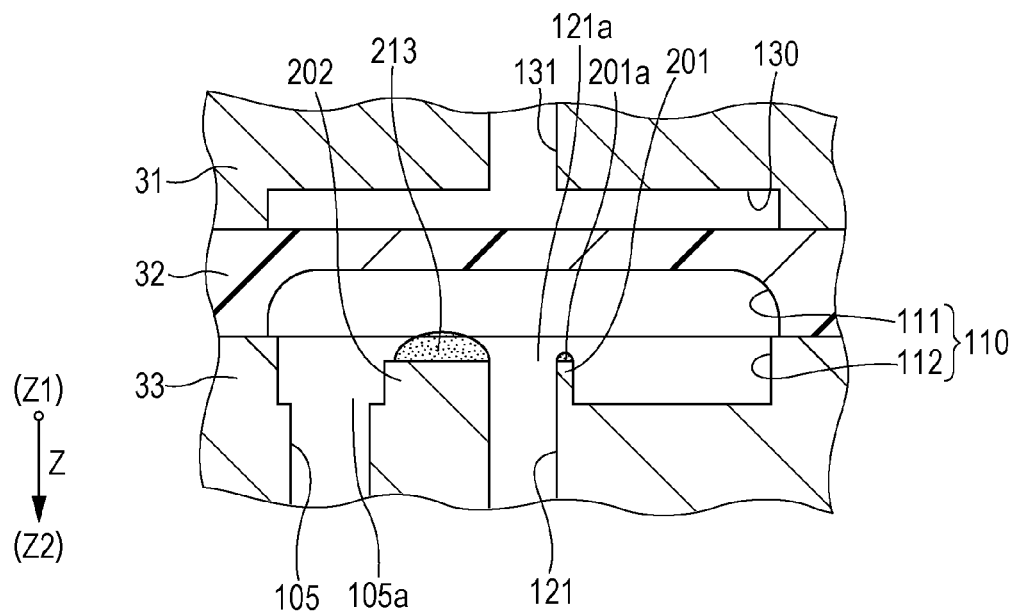

In the thus constructed flow path opening/closing apparatus 30, as shown in FIGS. 3A and 3B, the outflow opening 121a is closed by applying pressure into the pressure regulation chamber 130 to move the lid member 32 to the receptacle member 33 side due to elastic deformation or the like until the lid member 32 contacts the contact surface 201a of the first wall 201. At this time, since the second wall 202 is spaced from the first wall 201 by the groove portion 203 as a stepped portion, the lid member 32 can be inhibited from contacting the second wall 202. Furthermore, even if the lid member 32 contacts the second wall 202, the amount of accumulation of deposit on the second wall 202 can be made small since the second wall 202 is separated from the first wall 201 by the groove portion 203. Specifically, since as shown in FIG. 6A, the groove portion 203 is provided between the first wall 201 and the second wall 202, accumulation of components contained in the ink on the region of the contact, which may possibly occur due to repeated contacts of the lid member 32 with the Z1-side surface of the second wall 202, will be curbed. That is, because a deposit 211 accumulated on the contact surface 201a of the first wall 201 and a deposit 213 accumulated on the second wall 202 are separate from each other by the groove portion 203, the growth of the deposits 211 and 212, that is, the amount of accumulation thereof, can be reduced. In contrast, in the case where, as shown in FIG. 6B, the second wall 202 is provided at the same height in the third direction Z as the first wall 201 and the first wall 201 and the second wall 202 are not separated by providing therebetween a stepped portion such as the groove portion 203, the lid member 32 contacts the second wall 202 as well, so that a deposit 213 grows large over Z1-side surfaces of the first wall 201 and the second wall 202 as compared with the deposits 211 and 212 in this exemplary embodiment shown in FIG. 6A. If the deposit 213 grows large in this manner, the deposit 213 intervenes between the lid member 32 and the receptacle member 33 so that the lid member 32 cannot tightly contact the receptacle member 33 and therefore the closure of the outflow opening 121a cannot be certainly carried out. In this exemplary embodiment, since the groove portion 203 forming a stepped portion is provided between the first wall 201 and the second wall 202, lid member 32 does not easily contact the second wall 202; furthermore, even if the lid member 32 contacts the second wall 202, the amounts of accumulation of the deposits 211 and 212 are reduced so that imperfect closure of the outflow opening 121a can be inhibited for a long time.

Thus, in this exemplary embodiment, although the second wall 202 that inhibits residence of bubbles or undesired matters contained in ink and therefore improves the discharging capability is provided, the growth of deposit due to repeated contacts with the lid member 32 can be inhibited since the groove portion 203, which is a stepped portion, is provided. Therefore, the performance of discharging bubbles and undesired matters can be improved, and the growth of deposit during repeated uses can be inhibited to ensure appropriate opening-closing operations for a long time.

Incidentally, although in the exemplary embodiment, the groove portion 203 that forms a stepped portion is provided between the first wall 201 and the second wall 202, this configuration is not particularly restrictive. That is, the first wall 201 and the second wall 202 being separate by a stepped portion includes a configuration in which one of the first wall 201 and the second wall 202 is lower in the height in the third direction Z than the other.

Figure 7A:
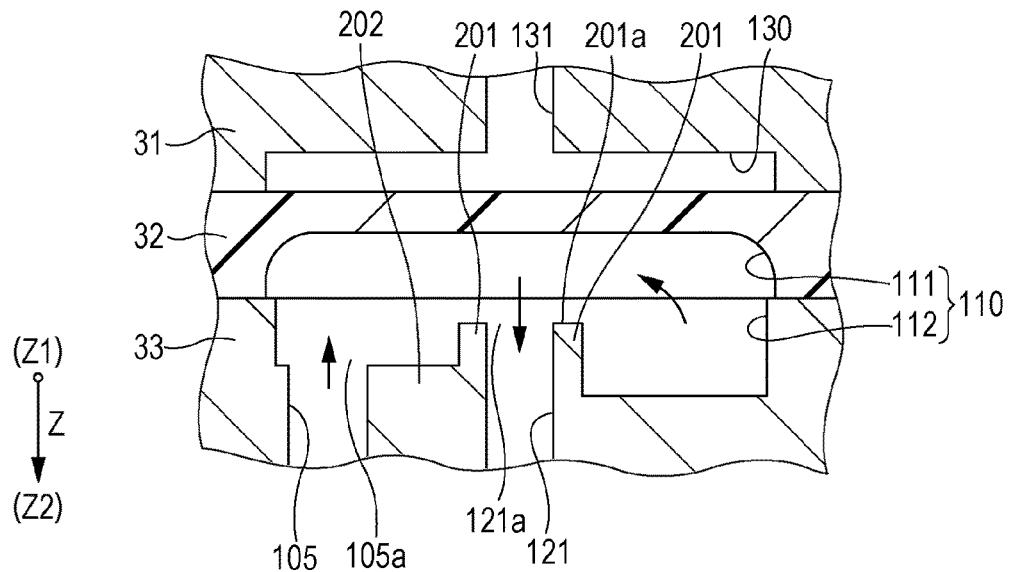
FIGS. 7A and 7B are sectional views of portions of a modification of the flow path opening/closing apparatus according to Exemplary Embodiment 1.
Figure 7B:
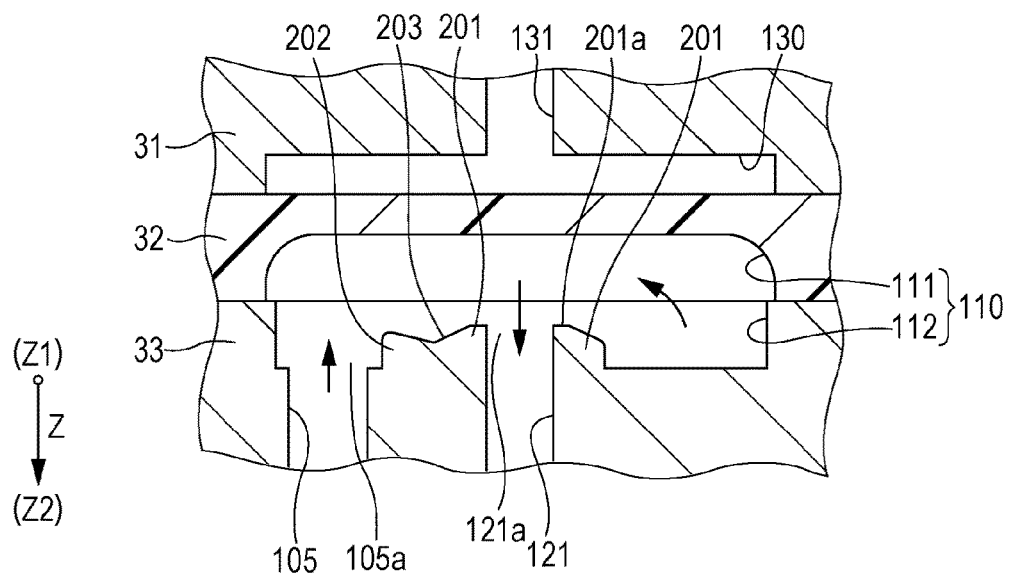

Modifications of the stepped portion between the first wall 201 and the second wall 202 are shown in FIGS. 7A and 7B. FIGS. 7A and 7B are enlarged partial sectional views of modifications of the flow path opening/closing apparatus of Exemplary Embodiment 1.

As shown in FIG. 7A, the height of the second wall 202 in the third direction Z, that is, the position of the Z1-side surface of the second wall 202, may be lower than that of the contact surface 201a of the first wall 201, that is, the Z1-side surface of the second wall 202 may be provided to the Z2 side of the contact surface 201a of the first wall 201. In this manner, the first wall 201 and the second wall 202 may also be provided with different heights in the third direction Z to provide a stepped portion between the first wall 201 and the second wall 202 so that the contact of the lid member 32 with the second wall 202 is avoided as much as possible.

Note that although a configuration in which the second wall 202 is higher in the third direction Z than the first wall 201 can also be described as the first wall 201 and the second wall 202 being separate by a stepped portion, this configuration actively allows the moving lid member 32 to easily contact the second wall 202 and is therefore not preferable. That is, in order to avoid the contact of the lid member 32 with the second wall 202 as much as possible, it is preferable that the second wall 202 be lower than the first wall 201 in terms of the height in the third direction Z.

Furthermore, as shown in FIG. 7B, a surface of the second wall 202 substantially facing in the third direction Z may be tilted relative to a plane that contains the first direction X and the second direction Y. Specifically, the above-described groove portion 203 whose width gradually decreases in the increasing depth direction may be formed in the Z1-side surface of the second wall 202. This configuration is also able to avoid the contact of the lid member 32 with the second wall 202 as much as possible.

Exemplary Embodiment 2

Figure 8:
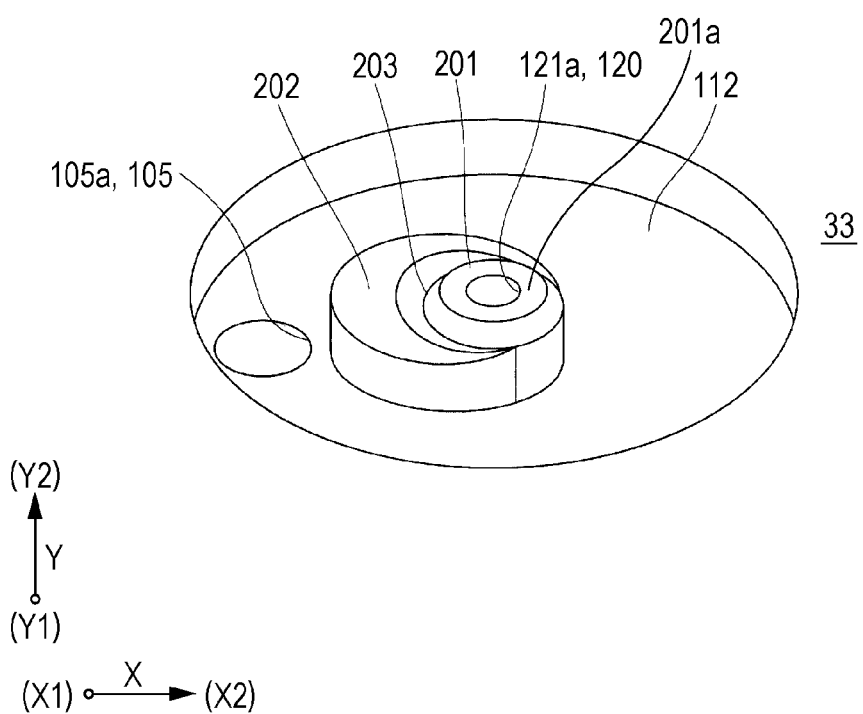
FIG. 8 is a perspective view of portions of a flow path opening/closing apparatus according to Exemplary Embodiment 2.
Figure 9:
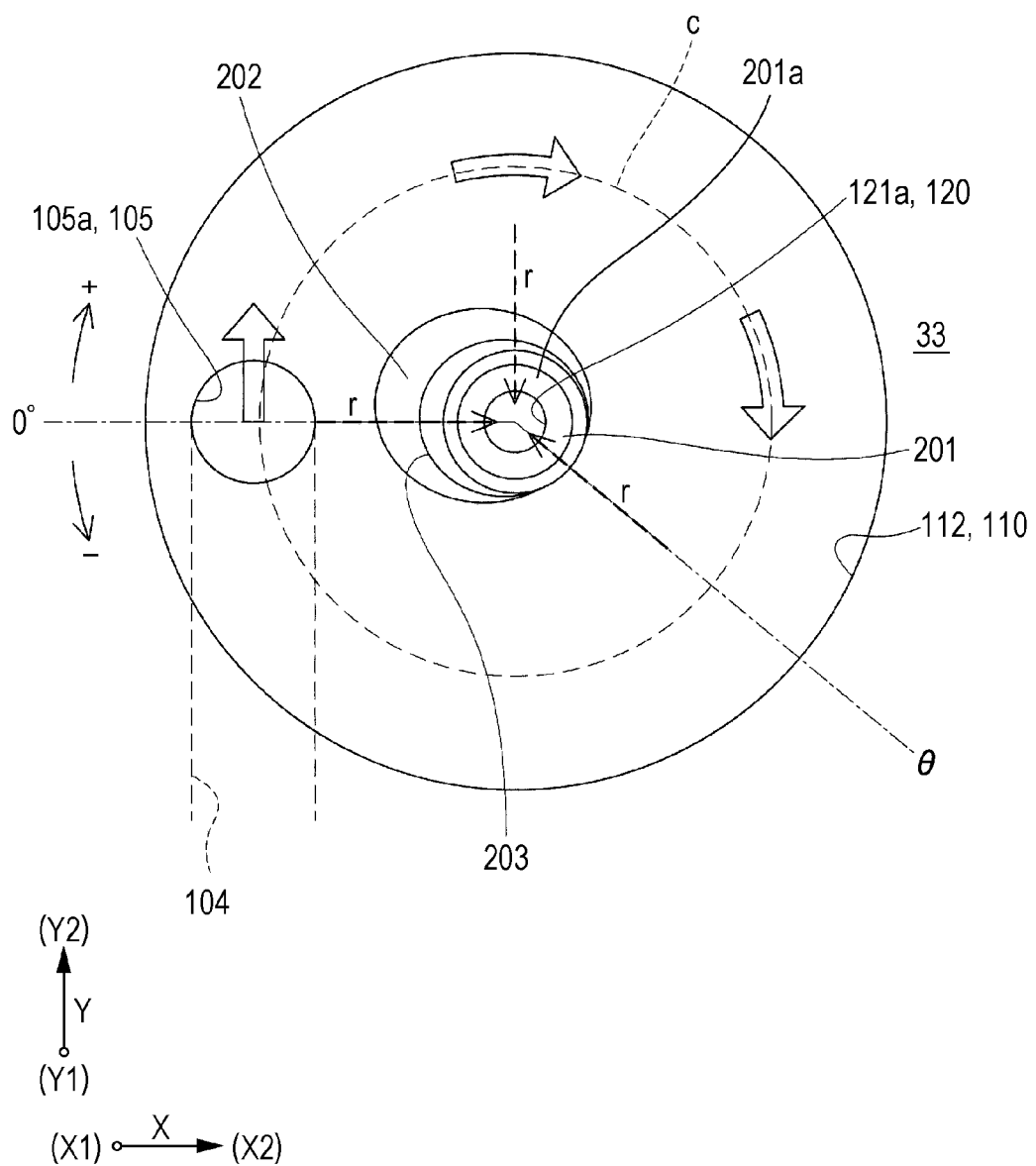
FIG. 9 is a plan view of portions of the flow path opening/closing apparatus according to Exemplary Embodiment 2.

FIG. 8 is a perspective view of portions of a flow path opening/closing apparatus according to Exemplary Embodiment 2 of the invention. FIG. 9 is a plan view of portions of the flow path opening/closing apparatus. Substantially the same members as those in the foregoing exemplary embodiment are denoted by the same reference characters, and redundant descriptions will be omitted.

A flow path opening/closing apparatus 30 of this exemplary embodiment, as in Exemplary Embodiment 1 described above, includes a first flow path member 31, a lid member 32, a receptacle member 33, and a second flow path member 34 as shown in the aforementioned drawings.

Then, a second recess portion 112 of the receptacle member 33 is provided with a first wall 201 and a second wall 202.

The second wall 202 is provided on a virtual straight line that connects an inflow opening 105a and an outflow opening 121a.

Furthermore, the second wall 202 in this exemplary embodiment is provided along only a portion of the perimeter of the outflow opening 121a, so that the portion where the flow path resistance to a flow from a liquid reservoir portion 110 to the outflow opening 121a in a radius direction r of the circle c is the smallest is a portion where the second wall 202 is not provided. This portion of the second wall 202 where the flow path resistance to flow in the radius direction r is the smallest is preferred to be disposed in a range of angular position greater than or equal to 180 degrees and less than or equal to 270 degrees where 0 degree is defined at the position of the inflow opening 105a and the positive direction is the clockwise direction, and is at the position of 225 degrees in this exemplary embodiment. That is, since the second wall 202 is not provided at the position of 225 degrees, the flow path resistance to flow in a radius direction r toward the outflow opening 121a is the smallest at the position of 225 degrees.

Furthermore, in this exemplary embodiment, the thickness of the second wall 202 in the radius direction r of a virtual circle c whose center is in the outflow opening 121a is changed in the circumferential direction of the outflow opening 121a so that the flow path resistance to flow from the liquid reservoir portion 110 toward the outflow opening 121a in a radius direction r of the virtual circle c whose center is in the outflow opening 121a degrees gradually in a circumferential direction of the circle c from the inflow opening 105a. Specifically, as for the second wall 202, the thickness in the radius direction r is the greatest in a portion of the second wall 202 that is at degree in angular position and gradually decreases from the portion at 0 degree both clockwise and counterclockwise toward the portion whose angular position is 225 degree. Incidentally, in this exemplary embodiment, the second wall 202 is provided in a range from the position of 230 degrees clockwise to the position of 220 degrees, similarly to Exemplary Embodiment 1 described above.

Thus, the thickness of the second wall 202 in the radius direction r can be changed in the foregoing manner to provide a configuration in which the flow path resistance to flow in the radius direction r toward the outflow opening 121a decreases gradually in circumferential directions of the circle c from the inflow opening 105a. Therefore, the second wall 202 causes formation of flows of ink in circumferential directions within the liquid reservoir portion 110, so that the capability of discharging bubbles or undesired matters can be improved.

Furthermore, in this exemplary embodiment, the second wall 202 is provided with the same height in the third direction Z as the first wall 201, and a groove portion 203 is formed between the first wall 201 and the second wall 202 to provide a stepped portion.

Thus, the provision of the stepped portion between the first wall 201 and the second wall 202 in the foregoing manner inhibits, as in Exemplary Embodiment 1, the lid member 32 from contacting the second wall 202 and, even if the lid member 32 contacts the second wall 202, inhibits the growth of deposit to ensure appropriate opening and closing operations of the outflow opening 121a.

Other Exemplary Embodiments

Although the exemplary embodiments of the present invention have been described above, the basic construction of the invention is not limited by the foregoing descriptions.

For example, although in Exemplary Embodiments 1 and 2, the stepped portion is provided by the groove portion 203 between the first wall 201 and the second wall 202, this configuration is not particularly restrictive, that is, a configuration in which a stepped portion is not provided between the first wall 201 and the second wall 202 may also be adopted. Although in the case without a stepped portion the contact surface 201a of the first wall 201 and the Z1-side surface of the second wall 202 are flush with each other, for example, in Exemplary Embodiment 2 described above, it suffices that in such a case the degree of the contact of the lid member 32 is controlled. More specifically, it suffices that the contact of the lid member with the flush surfaces is controlled so that in the flush surfaces, the first wall 201 as a portion that the lid member 32 contacts and the second wall 202 as a portion that the lid member 32 does not contact can be discriminated.

Furthermore, although in the forgoing exemplary embodiments, the portion that gives the smallest clearance h between the second wall 202 and the lid member 32 is provided at the angular position of 0 degree and the portion that gives the largest clearance h is provided at the angular position of 225 degrees, this is not particularly restrictive, that is, the range in which the portion of the second wall 202 with the smallest clearance h extends in a circumferential direction of the outflow opening 121a and the range in which the portion of the second wall 202 with the largest clearance h extends in a circumferential direction of the outflow opening 121a are not limited to the ranges described above. For example, the portion that gives the smallest clearance h may be provided continuously over a range of angular position that is less than or equal to 90 degrees and greater than or equal to 270 degrees. Likewise, the portion that gives the largest clearance h may be provided continuously over a range of angular position that is greater than or equal to 180 degrees and less than or equal to 270 degrees. In such cases, the portion with the smallest clearance h and the portion with the largest clearance h do not exist simultaneously at the same angular position. Furthermore, in the case where ink flows counterclockwise, too, the portion that gives the largest clearance h may be provided continuously over a range of angular position greater than or equal to 90 degrees and less than or equal to 180 degrees.

Furthermore, although in the foregoing various exemplary embodiments, the number of each of the inflow path 100, the liquid reservoir portion 110, and the outflow path 120 provided in the flow path opening/closing apparatus 30 is one, this is not particularly restrictive, that is, the number of each of the inflow path 100, the liquid reservoir portion 110, and the outflow path 120 provided in the flow path opening/closing apparatus 30 may be two or more. Of course, an intermediate portion of each flow path of the flow path opening/closing apparatus 30 may be provided with a filter that removes undesired matters contained in ink, a heating unit such as a heater that heats ink, etc. Furthermore, a plurality of recording heads 20 may be fixed to one flow path opening/closing apparatus 30.

Figure 10:
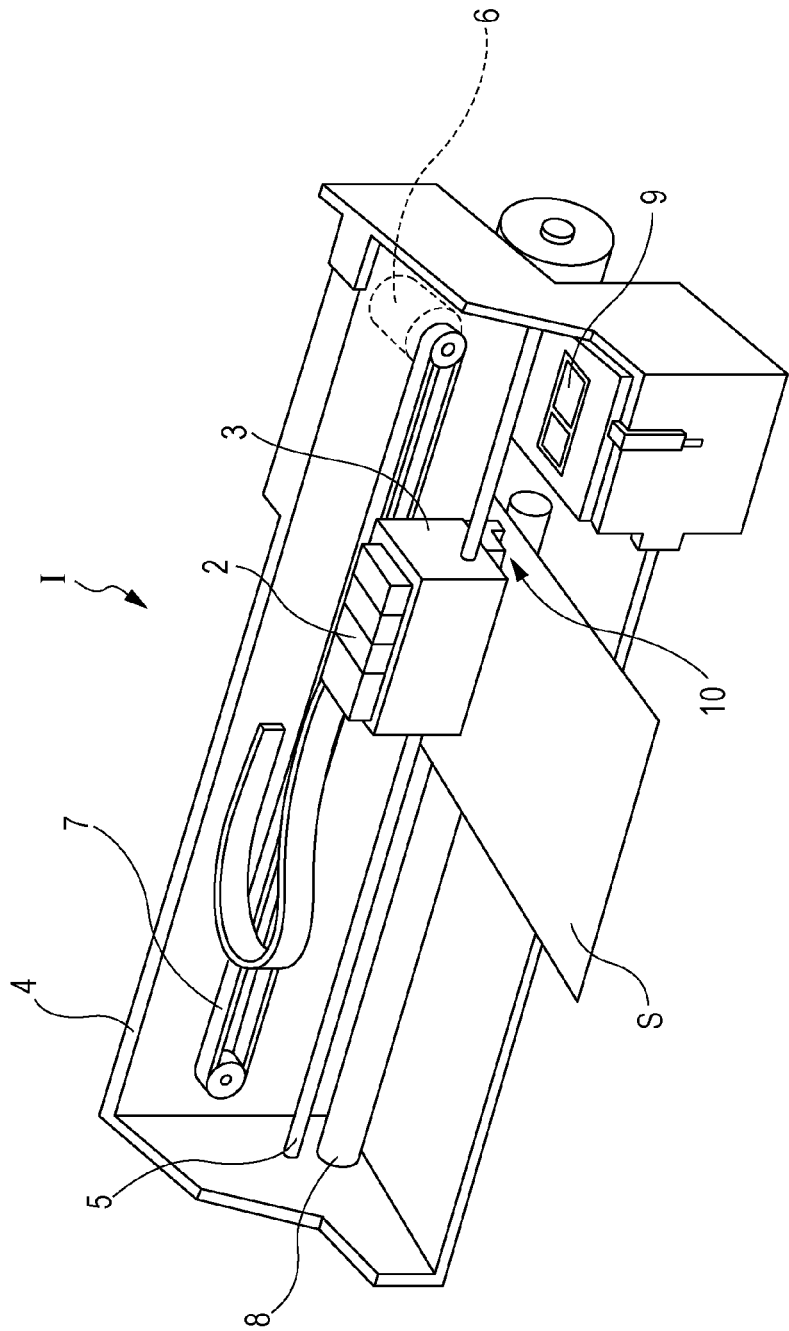
FIG. 10 is a schematic diagram of a recording apparatus according to an exemplary embodiment of the invention.

Furthermore, the head unit 10 in each of the foregoing exemplary embodiments is mounted in an ink jet type recording apparatus I. FIG. 10 is a schematic diagram illustrating an example of such an ink jet type recording apparatus.

In an ink jet type recording apparatus I shown in FIG. 10, the head unit 10 is provided with an attachable and detachable ink cartridge 2 that is a liquid storage unit. A carriage 3 on which the head unit 10 is mounted is provided to be freely movable in axis directions of a carriage shaft 5 that is attached to an apparatus body 4.

The carriage 3 on which the head unit 10 is mounted is moved along the carriage shaft 5 as drive force of a driving motor 6 is transferred to the carriage 3 via a plurality of gears (not depicted) and a timing belt 7. Furthermore, the apparatus body 4 is provided with a transport roller 8 as a transporting unit. A recording sheet S that is a record medium, such as paper, is transported by the transport roller 8. Incidentally, the transporting unit that transports the recording sheet S is not limited to a transport roller but may also be a belt, a drum, etc.

Still further, the apparatus body 4 includes a suction unit 9 that is provided at one side in the movement directions of the carriage 3. The suction unit 9 contacts the liquid ejecting surface 22 of the head unit 10 to suck bubbles and undesired matters together with ink from the nozzles 21. Using the thus provided suction unit 9, various operations are performed, including a cleaning operation of cleaning the head unit 10 by sucking ink from the vicinity of the nozzles 21, an initial filling operation of filling the inside of the head unit 10 with the ink, etc. Furthermore, it is also possible to perform so-called choke cleaning in which suction is performed by the suction unit 9 while the outflow opening 121a is closed by using the flow path opening/closing apparatus 30 in any one of the foregoing exemplary embodiments, and then outflow opening 121a is opened, so that the ink in the flow path is discharged all at once from the nozzles 21 together with undesired matters such as bubbles.

Although the foregoing ink jet type recording apparatus I is an example of an ink jet type recording apparatus in which the head unit 10 is mounted on the carriage 3 and moved in main scanning directions, this is not particularly restrictive. The invention is also applicable to, for example, a so-called line type recording apparatus in which a head unit 10 is fixed in position and a recording sheet S, such as paper, is moved in a subsidiary scanning direction to perform printing.

Furthermore, although in the foregoing example, the ink jet type recording apparatus I has a construction in which the ink cartridge 2 that is a liquid storage unit is mounted on the carriage 3, this is not particularly restrictive. For example, a liquid storage unit, such as an ink tank, may be fixed to the apparatus body 4, and the liquid storage unit and the head unit 10 may be connected via a supply pipe such as a tube. Furthermore, the liquid storage unit does not need to be mounted in the ink jet type recording apparatus.

Furthermore, although in the foregoing exemplary embodiments, the flow path opening/closing apparatus 30 is mounted on the head unit 10, the liquid ejecting apparatus of the invention may be a liquid ejecting apparatus in which the flow path opening/closing apparatus 30 and the recording head 20 are provided at separate positions.

Although in conjunction with the foregoing exemplary embodiments, the ink jet type recording head unit has been described as an example of a liquid ejecting head unit and the ink jet type recording apparatus has been described as an example of a liquid ejecting apparatus, the invention is intended widely for liquid ejecting head units and liquid ejecting apparatuses in general, and is of course applicable also to liquid ejecting head units and liquid ejecting apparatuses that have a liquid ejecting head that ejects a liquid other than ink. Other examples of liquid ejecting heads to which the invention is applicable include various types of recording heads for use in image recording apparatuses such as printers, color material ejecting heads for use in the production of color filters of liquid crystal displays and the like, electrode material ejecting heads for use in the electrode formation in organic electroluminescence (EL) displays, field emission displays (FEDs), etc., bioorganic substance ejecting heads for use in the production of bio chips. The invention is also applicable to liquid ejecting head units and liquid ejecting apparatuses that have liquid ejecting heads as mentioned above.

Further, the invention is not limited to a flow path opening/closing apparatus for use in liquid ejecting apparatuses that are represented by the ink jet type recording apparatus I but also applicable to flow path opening/closing apparatuses for use in other kinds of apparatuses.

The entire disclosure of Japanese Patent Application No. 2014-218641 filed Oct. 27, 2014 is expressly incorporated by reference herein.

What is claimed is:

1. A flow path opening/closing apparatus comprising:
a lid member; and
a receptacle member fixed to the lid member,
wherein the receptacle member includes:
a first wall that defines an outflow opening that is open toward the lid member, a fluid flowing from a lid to a receptacle side via the outflow opening;
a second wall provided around the first wall; and
an inflow opening provided adjacent to the second wall, the fluid flowing from the receptacle side to the lid side via the inflow opening, and
wherein the lid member closes the outflow opening by contacting the first wall due to relative movement of the lid member with respect to the receptacle member,
wherein a surface of the first wall facing the lid member and a surface of the second wall facing the lid member are separate by a stepped portion, and
wherein the inflow opening is located farther from the outflow opening than the second wall in a plan view.

2. A flow path opening/closing apparatus comprising:
a lid member; and
a receptacle member fixed to the lid member,
wherein the receptacle member includes:
a first wall that defines an outflow opening that is open toward the lid member, a fluid flowing from a lid side to a receptacle side via teh outflow opening;
a second wall provided around the first wall; and
an inflow opening provided adjacent to the second wall, the fluid flowing from the receptacle side to the lid side via the inflow opening,
wherein a surface of the first wall facing the lid member and a surface of the second wall facing the lid member are respectively spaced apart from the lid member by the same distance so as to be located at the same plane,
wherein the lid member closes the outflow opening by contacting the first wall without contacting the second wall, due to relative movement of the lid member with respect to the receptacle member, and
wherein the inflow opening is located farther from the outflow opening than the second wall in a view.

3. The flow path opening/closing apparatus according to claim 1,
wherein the second wall is provided on a virtual straight line that connects the inflow opening and the outflow opening.

4. The flow path opening/closing apparatus according to claim 3,
wherein flow path resistance to the fluid flowing toward the outflow opening in a radius direction of a virtual circle whose center is a center of the outflow opening decreases gradually in a circumferential direction of the virtual circle from the inflow opening.

5. The flow path opening/closing apparatus according to claim 3,
wherein a smallest clearance portion of the second wall where a clearance between the second wall and the lid member is smallest is provided in a range of angular positions less than or equal to 90 degrees and greater than or equal to 270 degrees along a virtual circle whose center is a center of the outflow opening when an angular position of a center of the inflow opening is defined as 0 degree with respect to the center of the outflow opening and when a clockwise direction from the center of the inflow opening is a positive direction with respect to the center of the outflow opening.

6. The flow path opening/closing apparatus according to claim 3,
wherein a largest clearance portion of the second wall where a clearance from the lid member is largest is provided in a range of angular positions greater than or equal to 90 degrees and less than or equal to 180 degrees along a virtual circle whose center is a center of the outflow opening when an angular position of a center of the inflow opening is defined as 0 degree with respect to the center of the outflow opening and when a clockwise direction from the center of the inflow opening is a positive direction with respect to the center of the outflow opening, and
an inflow path of the fluid that extends from the inflow opening is provided so that the fluid supplied from the inflow opening flows in a counterclockwise direction along an arc of the virtual circle.

7. The flow path opening/closing apparatus according to claim 3,
wherein a largest clearance portion of the second wall where a clearance from the lid member is largest is provided in a range of angular positions greater than or equal to 180 degrees and less than or equal to 270 degrees along a virtual circle whose center is a center of the outflow opening when an angular position of a center of the inflow opening is defined as 0 degree with respect to the center of the outflow opening and when a clockwise direction from the center of the inflow opening is a positive direction with respect to the center of the outflow opening, and
an inflow path of the fluid that extends from the inflow opening is provided so that the fluid supplied the from the inflow opening flows in the clockwise direction along an arc of the virtual circle.

8. The flow path opening/closing apparatus according to claim 2,
wherein the second wall is provided on a virtual straight line that connects the inflow opening and the outflow opening.

9. The flow path opening/closing apparatus according to claim 8,
wherein flow path resistance to the fluid flowing toward the outflow opening in a radius direction of a virtual circle whose center is a center of the outflow opening decreases gradually in a circumferential direction of the virtual circle from the inflow opening.

10. The flow path opening/closing apparatus according to claim 8, wherein a smallest clearance portion of the second wall where a clearance between the second wall and the lid member is smallest is provided in a range of angular positions less than or equal to 90 degrees and greater than or equal to 270 degrees along a virtual circle whose center is a center of the outflow opening when an angular position of a center of the inflow opening is defined as 0 degree with respect to the center of the outflow opening and when a clockwise direction from the center of the inflow opening is a positive direction with respect to the center of the outflow opening.

11. The flow path opening/closing apparatus according to claim 8,
wherein a largest clearance portion of the second wall where a clearance from the lid member is largest is provided in a range of angular positions greater than or equal to 90 degrees and less than or equal to 180 degrees along a virtual circle whose center is a center of the outflow opening when an angular position of a center of the inflow opening is defined as 0 degree with respect to the center of the outflow opening and when a clockwise direction from the center of the inflow opening is a positive direction with respect to the center of the outflow opening, and
an inflow path of the fluid that extends from the inflow opening is provided so that the fluid supplied from the inflow opening flows in a counterclockwise direction along an arc of the virtual circle.

12. The flow path opening/closing apparatus according to claim 8,
wherein a largest clearance portion of the second wall where a clearance from the lid member is largest is provided in a range of angular positions greater than or equal to 180 degrees and less than or equal to 270 degrees along a virtual circle whose center is a center of the outflow opening when an angular position of a center of the inflow opening is defined as 0 degree with respect to the center of the outflow opening and when a clockwise direction is a positive direction with respect to the center of the outflow opening, and
an inflow path of the fluid that extends from the inflow opening is provided so that the fluid supplied from the inflow opening flows in a clockwise direction along an arc of the virtual circle.

13. A liquid ejecting apparatus comprising:
the flow path opening/closing apparatus according to claim 1; and
a liquid ejecting head that ejects the fluid supplied via the flow path opening/closing apparatus.

14. A liquid ejecting apparatus comprising:
the flow path opening/closing apparatus according to claim 2; and
a liquid ejecting head that ejects the fluid supplied via the flow path opening/closing apparatus.

15. A liquid ejecting apparatus comprising:
the flow path opening/closing apparatus according to claim 3; and
a liquid ejecting head that ejects the fluid supplied via the flow path opening/closing apparatus.

16. A liquid ejecting apparatus comprising:
the flow path opening/closing apparatus according to claim 4; and
a liquid ejecting head that ejects the fluid supplied via the flow path opening/closing apparatus.

17. A liquid ejecting apparatus comprising:
the flow path opening/closing apparatus according to claim 5; and
a liquid ejecting head that ejects the fluid supplied via the flow path opening/closing apparatus.

18. A liquid ejecting apparatus comprising:
the flow path opening/closing apparatus according to claim 8; and
a liquid ejecting head that ejects the fluid supplied via the flow path opening/closing apparatus.

19. A liquid ejecting apparatus comprising:
the flow path opening/closing apparatus according to claim 9; and
a liquid ejecting head that ejects the fluid supplied via the flow path opening/closing apparatus.

20. A liquid ejecting apparatus comprising:
the flow path opening/closing apparatus according to claim 10; and
a liquid ejecting head that ejects the fluid supplied via the flow path opening/closing apparatus.

* * * * *